United States Patent [19]
Verhulst et al.

[11] Patent Number: 5,151,804
[45] Date of Patent: Sep. 29, 1992

[54] FERROELECTRIC LIQUID CRYSTAL DISPLAY HAVING A SPREAD OF ANGLES FOR GRAYSCALE AND METHOD OF MANUFACTURE

[75] Inventors: Antonius G. H. Verhulst; Wilbert J. A. M. Hartmann; Franciscus J. Stommels; Ann M. M. Luyckx-Smolders, all of Eindhoven, Netherlands

[73] Assignee: U.S. Philips Corporation, New York, N.Y.

[21] Appl. No.: 535,809

[22] Filed: Jun. 11, 1990

[30] Foreign Application Priority Data

Jun. 12, 1989 [NL] Netherlands ............... 8901481

[51] Int. Cl.$^5$ ............... G02F 1/1343; G02F 1/1339; G02F 1/13
[52] U.S. Cl. ................ 359/56; 340/784; 359/76; 359/81; 359/87; 359/100
[58] Field of Search ............. 350/350 S, 341, 340, 350/339 R; 359/56, 76, 87, 81, 100; 340/784

[56] References Cited

U.S. PATENT DOCUMENTS

| | | | |
|---|---|---|---|
| 4,411,494 | 10/1983 | Crossland et al. | 350/339 R |
| 4,705,345 | 11/1987 | Ayliffe et al. | 350/350 S |
| 4,796,980 | 1/1989 | Kaneko et al. | 350/350 S |
| 4,861,143 | 8/1989 | Yamazaki et al. | 350/350 S |
| 4,932,758 | 6/1990 | Hanyu et al. | 350/350 S |
| 4,966,442 | 10/1990 | Ono et al. | 350/339 R |
| 4,976,515 | 12/1990 | Hartmann | 359/56 |
| 4,978,203 | 12/1990 | Yamazaki et al. | 350/339 R |
| 4,995,706 | 2/1991 | Inujima et al. | 350/350 S |

Primary Examiner—Stanley D. Miller
Assistant Examiner—Ron Trice
Attorney, Agent, or Firm—John C. Fox

[57] ABSTRACT

A liquid crystal device incorporating ferroelectric liquid crystal medium having smectic layers between two supporting plates provided with electrodes, the smectic layers exhibiting a spread of angles with respect to at least one of the supporting plates, whereby a gradual transmission/voltage characteristic is achieved. The spread of angles can be obtained by any of several techniques, such as subjecting the device to a low frequency electric field, or a local thermal, mechanical, chemical or magnetic treatment.

33 Claims, 2 Drawing Sheets

5,151,804

FERROELECTRIC LIQUID CRYSTAL DISPLAY HAVING A SPREAD OF ANGLES FOR GRAYSCALE AND METHOD OF MANUFACTURE

BACKGROUND OF THE INVENTION

The invention relates to a liquid crystal device comprising a ferroelectric liquid crystal medium between two supporting plates provided with electrodes, which device has an adjustable light transmissivity.

Such a device is suitable, for example as a light shutter.

The invention also relates to a display device comprising a ferroelectric liquid crystalline medium between first and second supporting plates, the first of which comprises a system of row electrodes and the second comprises a system of column electrodes, the crossings of row and column electrodes defining pixels.

Such a device is suitable for passively driven matrices having large numbers of lines, such as TV, and datagraphic applications.

A display device of this type is described in EP 0,214,857. In this device the desired transmission states (representing a grey scale) are obtained by switching on a pixel in n successive fields during a weighted period, dependent on the desired transmission value. This means that a picture memory is required and notably in video applications the ferroelectric liquid crystalline medium must switch n times as fast as would be necessary if grey scale could be achieved more directly. Moreover, during the second and subsequent selected fields the pixel is never completely switched on, which leads to loss of brightness.

OBJECTS AND SUMMARY OF THE INVENTION

One of the objects of the invention is to eliminate these drawbacks by providing a display device in which grey scales can be obtained with easily realisable signals on row as well as column electrodes.

Another object of the invention is to provide such a device in which the data voltages on the column electrodes can be kept so low that possible crosstalk does not affect or hardly affects the electro-optical transmission value (grey scale) of the display medium.

Other objects of the invention are to provide such a display device in which the use of picture memories is not necessary, and to provide such a device in which there is less loss of brightness.

It is a more general object of the invention to provide a ferroelectric liquid crystal device having a gradual transmission/voltage characteristic.

The invention is based, on the recognition that the threshold voltage in the transmission/voltage characteristic is determined in large part by the angle that the smectic layers of the ferroelectric medium makes with respect to the supporting plates.

In addition, the invention is based on the recognition that it is possible, notably in a display device, to give the transmission/voltage characteristic of a pixel a relatively large transition range. The range of data voltages used may then be limited to substantially the width of this transition range.

A ferroelectric liquid crystal device according to the invention is characterized in that, viewed normally to the surface of the device, the smectic layers of the ferroelectric liquid crystal medium exhibits a spread of angles with respect to at least one of the supporting plates.

In a display device according to the invention, the smectic layers of the ferroelectric liquid crystal medium exhibits a spread of angles with respect to at least one of the supporting plates at least at a part of the area of crossing of a row electrode and a column electrode, defining a pixel as viewed normally to the plates.

Due to the spread of this angle, which is preferably distributed uniformly from pixel-to-pixel, threshold voltages of local transmission/voltage characteristics of smectic layers having a given angle $\delta$ are uniformly distributed across the pixel, as viewed on a microscale, which distribution, as viewed on a macroscale, becomes manifest in a transmission/voltage characteristic having a gradual slope, and a transition range having a width of at least 0.5 Volt. The width of the transition range is understood to mean the voltage range within which the transmission increases from 10% to 90% or decreases from 90% to 10% of its maximum value.

The spread on a microscale can be obtained in a number of different ways, e.g., by a spread in the degree of surface roughness of the electrodes. The presence of spacers between the supporting plates also causes a change in the angle of the smectic layers. A preferred embodiment of a device according to the invention is therefore characterized in that it comprises at least 10 spacers per pixel.

More generally, it has been found that the creation of areas having different threshold voltages (and hence the said spread of the threshold voltage across different areas) is often related to the occurrence of so-called "hairpin defects". At the area of these needle defects (which are introduced, for example, by spacer particles, by a fast cooling of the liquid crystal material or by a rubbing treatment of the orienting surface), the areas with different angles of the smectic layers, and thus different threshold voltages, are produced by a treatment in a low frequency electric field with a high field strength. The length of the needle defects, which may detrimentally influence the transmission/voltage characteristic, can be reduced by a prior or subsequent treatment in a low frequency electric field with a low field strength.

When manufacturing a device according to the invention, it is therefore subjected to at least one low-frequency electric field treatments at a low field strength, preceded or followed, if necessary, by a treatment at a high field strength.

Low-frequency is herein understood to mean a frequency of 0.1–200 Hz. The duration of the treatment is of the order of 0.5–2 minutes and, like the field strength, is dependent on the liquid crystal material used.

It has also been found that these treatments make the device less sensitive to variations in the distance between the two supporting plates, because field strength variations play a role in acquiring said spreads, both during manufacture and during use.

The relevant spread can also be obtained by subjecting the pixels after filling to a local thermal treatment (for example, laser irradiation) while the ferroelectric liquid crystal traverses the smectic A-smectic C phase boundary.

The spread may also be obtained mechanically, chemically, magnetically or in another process; in this respect it may be advantageous to give the device a pretreatment introducing inhomogeneities.

BRIEF DESCRIPTION OF THE DRAWING

The invention will now be described in greater detail by way of example with reference to the accompanying drawings in which FIG. 2 is a diagrammatic representation of the molecular positions associated with two extreme positions in FIG. 1, while

DESCRIPTION OF THE PREFERRED EMBODIMENT

Figure 1:
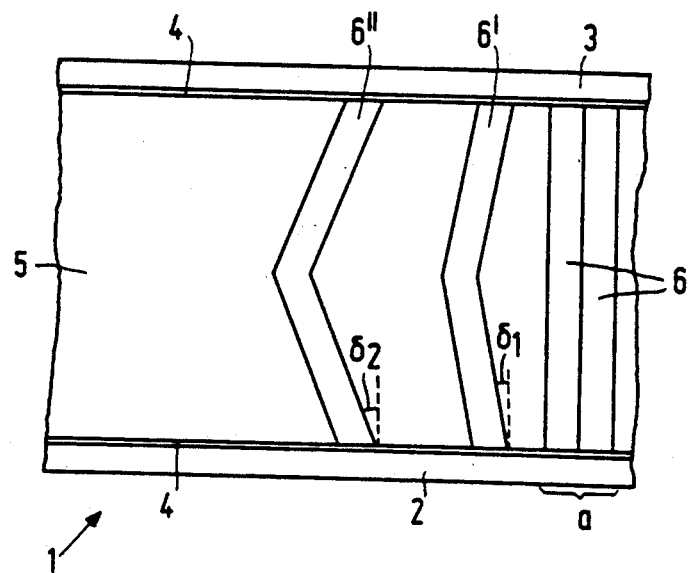
FIG. 1 is a diagrammatic cross-section of a part of a device according to the invention.

FIG. 1 shows diagrammatically a part of a surface-stabilized ferroelectric display device 1 according to the invention. Row and column electrodes or other electrodes (not shown) of conducting materials such as, for example, indium-tin-oxide (ITO) are provided on the two supporting plates 2 and 3 of, for example glass or quartz. The device also comprises polarizers which are not shown.

An optimum switching effect between a light-transmissive and a light-absorbing state is obtained if in both switching states the liquid crystal molecules are located, as it were, in parallel layers 6 perpendicular to the supporting plates (the so-called "bookshelf geometry") (situation a in FIG. 1). Such a surface-stabilized ferroelectric liquid crystal device can be obtained with a small thickness of the layer of liquid crystal material 5 and suitable orientation layers 4 on the supporting plates 2 and 3.

To produce a structure in which the layers deviate from the bookshelf geometry, the orientation layers 4 of, for example polyimide, polyamide or polyvinyl alcohol are subjected to a suitable rubbing treatment, whereafter the liquid crystal material (in this example ZLI 3654 of the firm of Merck) is introduced into the display device at an elevated temperature at which it is in the isotropic phase, whereafter it is slowly cooled down through the nematic phase and the smectic A phase to the smectic C phase. As is known, the orientation layer may also be obtained by (oblique) vapour deposition of silicon oxide or by other known techniques.

After cooling, the layers 6 in a device according to the invention do not have the completely perpendicular structure, but as a result of interactions of the liquid crystal molecules with the orienting layers 4 they have a kinked or "chevron" structure. These layers 6', 6" and 6 extend at an angle1 $\delta$ at the location of the supporting plates 2, 3 with respect to the normal on the supporting plates 2 and 3.

Figure 2:
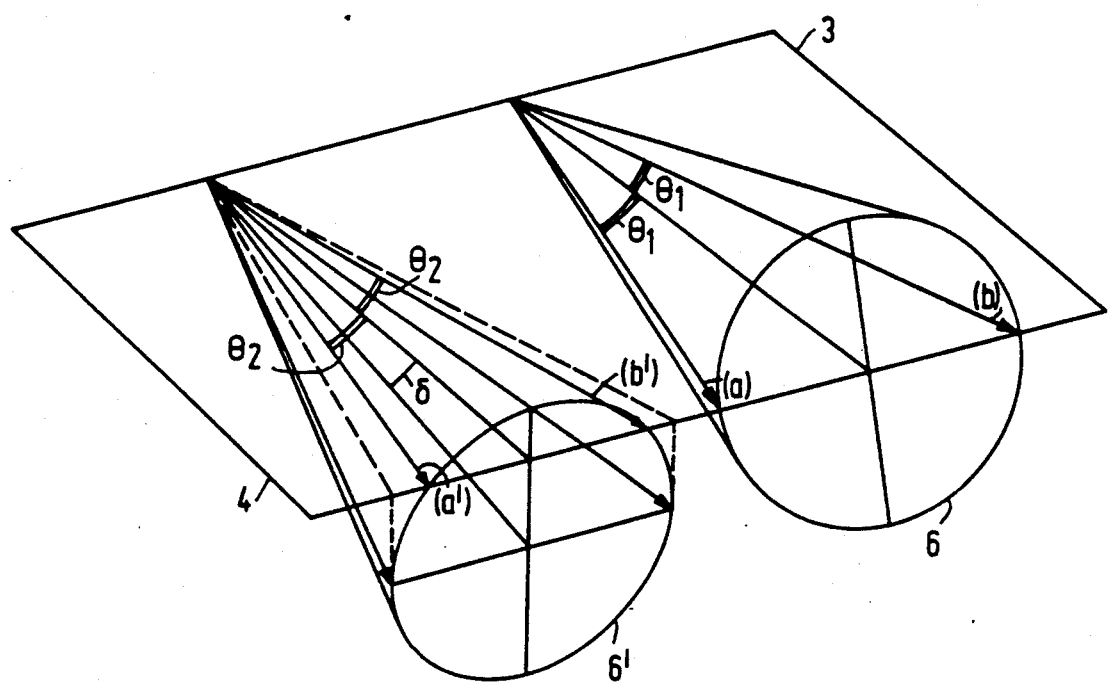

The molecules of the ferroelectric material, whose directors move in principle along the surface of a cone with its axis perpendicular to the layers 6, are differently aligned along the orienting layer 4 dependent on the angle $\delta$ in a surface-stabilized structure. This will be explained in greater detail with reference to FIG. 2 showing that the liquid crystal molecules are anchored for a layer 6 ($\delta=0$) with all molecules in a layer perpendicular to the supporting plate 3, and for a layer 6' which is aligned in such a way that the axis of the cone along which the molecules can move extends at an angle $\delta$ with respect to the supporting plate 3. Due to the action of the orienting layer 4, the possible positions of the molecules (director) on the cone are limited in both situations in the fieldless state to the positions (a) and (b) in the layer 6, and (a') and (b') in the layer 6'. Optically, this means that the two states have different switching angles $2\theta1$ and $2\theta2$. When switching between two optical states, the directors flip over, for example from position a(a') to position b(b').

The angle $\theta$ can be optically determined by determining the value of $\theta p$ for minimum intensity in transmission. ($\theta p$: angle of one of two mutually perpendicular polarizers with respect to the rubbing direction). In that case, $\theta = \theta p$.

In a measuring arrangement, areas in a surface-stabilized ferroelectric display device with different angles $\theta$ (or different angles $\delta$) were mutually compared for their switching behaviour. For areas of approximately 1 $\mu m^2$, the switching times, the optical switching angles and the transmission/voltage characteristics were measured. When reducing the angle $\delta$ (or increasing the angle $\theta$) a longer switching time is found at a fixed pulse amplitude, which may be explained by the fact that the director during switching must travel a longer path across the switching cone, as is shown in FIG. 2. Also the coupling of the electric field and the permanent polarization of the director may play a role in this respect. On the other hand, a reduction of the angle $\delta$ upon measurement with a fixed pulse duration was accompanied by an increase of the threshold voltage.

Figure 3A:
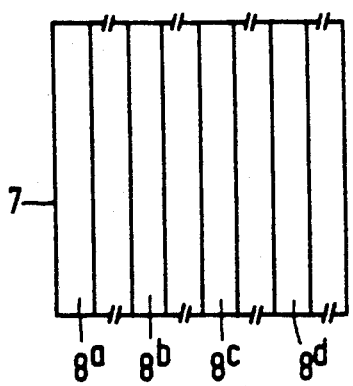
FIGS. 3a and 3b show diagrammatically a pixel of the device of FIG. 1, FIGS. 4a through e show the transmission/voltage characteristics of the pixels of FIG. 3 and the transmission/voltage characteristic of the entire pixel.
Figure 3B:
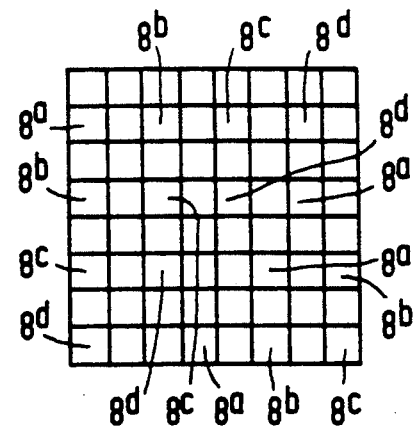
Figure 4A:
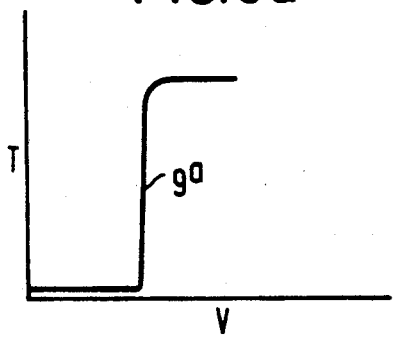
Figure 4B:
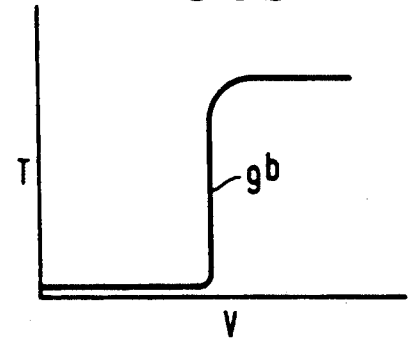
Figure 4C:
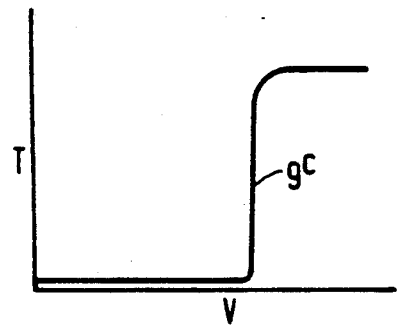
Figure 4D:
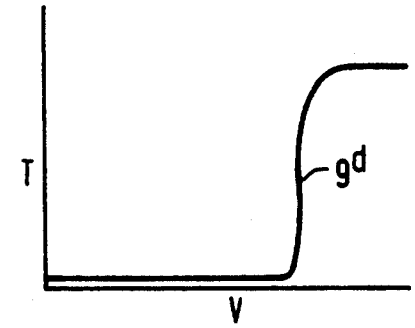
Figure 4E:
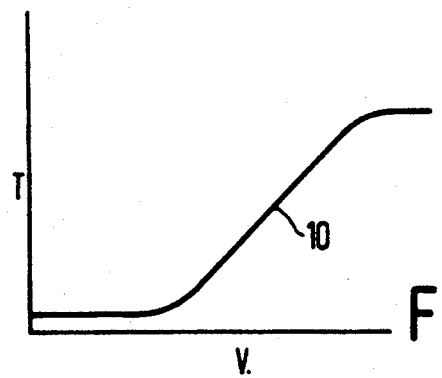

FIGS. 3a and b show an area of a pixel 7 which is subdivided into sub-areas 8a..., 8b..., 8c..., 8d... at which the value of the angle $\delta$ decreases from 8a to 8d. The sub-areas may be mutually arranged in different manners, as is shown in FIGS. 3a and 3b. A more arbitrary distribution is also possible.

FIGS. 4a through e show the transmission/voltage characteristics 9a, 9b, 9c, 9d associated with the sub-areas 8a, 8b, 8c, 8d, measured at a fixed pulse duration, and the transmission/voltage characteristic 10 associated with the overall area 7.

It is apparent from the Figure that the distribution of sub-areas having steep transmission/voltage characteristics and different threshold voltages across a pixel leads to a transmission/voltage characteristic having a wide transition range (a less steep slope) for the entire pixel, which provides the possibility of obtaining grey scale. The curve 10 can be explained from the fact that for a uniform distribution of the sub-areas 8 the areas with a low threshold voltage switch first at an increasing voltage, subsequently those with a slightly higher voltage, etc. The width of the transmission/voltage characteristic 10 may thereby be adjusted to a value of approximately 0.5–10 Volts.

To mitigate the detrimental influence of previous picture contents as much as possible, a pixel is brought to an extreme state before it is driven, as is described in greater detail in copending U.S. patent application Ser. No. 280,418, filed Dec. 6, 1988. Other drive schemes, such as the so-called "AC stabilisation" method, are alternatively possible.

The variation in the angle $\delta$ (and consequently in the apex angle of the "chevron") can be obtained in different manners. When cooling the ferroelectric liquid crystal material from the isotropic phase to the smectic C phase, so-called hairpin defects are usually produced.

These hairpin defects are produced generally at the location of inhomogeneities such as, for example, spacer spheres and are comparable to so-called "zigzag defects" at which the angle δ within the defect is opposed to that outside it.

A low voltage, low frequency treatment, for example, a square-wave voltage of ±2 V at 20 Hz for 2 minutes, causes these needle defects to shrink to minimum dimensions (<10 μm). In a subsequent treatment at a higher voltage (±10 V, 20 Hz, 1 minute), areas of layers with different δ will grow, generally starting at one of the shrunken hairpin defects. A uniform distribution of such areas can be obtained by increasing the number of needle defects, for example, by having a large number of spacer particles (>10 per pixel) (which may be formed, for example, by photolithographic methods), accelerated cooling or a special rubbing treatment (notably a low-energy rubbing treatment) of the orienting layers.

It is found that a larger threshold voltage spread among the areas and hence a more gradual transmission/voltage characteristic of the device can be obtained by subjecting the device subsequently to treatments with different electric voltages, for example, for a liquid crystal layer thickness of about 1.6 μm, first ±12.5 V, ±15 V, ±17.5 V, ±20 V, all at 20 Hz and for 1 minute. By variation of these process parameters (voltage variation, frequency, etc.) the threshold voltage spread and the slope of the transmission/voltage characteristic can be adjusted, dependent on the ferroelectric liquid crystal material and the thickness of the liquid crystal layer.

The threshold voltage spread can also be introduced by firstly giving the device a low-frequency alternating voltage treatment at a fairly high voltage (for the material ZLI 3654, for example, ±15 V, 20 Hz, for 1 minute) so that many extra regions with a varying δ are produced on the sides of the needle defects, and by subsequently reducing substantially the still present hairpin defects by means of a treatment at a low electric voltage (e.g., ±2 V, 20 Hz, 2 minutes). Areas with different δ are then distributed across a pixel in such a way that a gradual transmission/voltage curve is obtained.

If necessary, the treatment may be continued at a higher voltage (approx. 25 V to 30 V) for 1 to 5 minutes. Although the distribution of different angles δ now becomes slightly narrower (closer to 0°), so that a less wide transition range in the transmission/voltage curve is obtained, the maximum transmission is higher, which results in a better contrast. Moreover, the device is less sensitive to crosstalk.

The variation of the angle δ can also be obtained by varying the rubbing energy, e.g., pressure during rubbing of the orientation layer 4.

Inhomogeneities in the orientation layer 4 may also be achieved by using two or more polymer types which cannot be fully mixed, or by promoting non-uniformities in certain reactions (for example, curing of the orientation layer), through chemical, thermal or irradiation differences.

In addition, a combination of an electric field treatment and a chemical treatment of the liquid crystal material may be employed to obtain this variation in δ, notably treatments influencing the viscosity, the elastic constants, and/or the spontaneous polarization of the material.

An electrical, magnetical, thermal or mechanical treatment may also be considered, by which the smectic layers are stressed or deformed, e.g., local heating or cooling or providing a thermal gradient across subareas of the material.

A combination of such methods is alternatively possible.

Instead of being used in a matrix-oriented display device, a device according to the invention may alternatively be used in other applications where a gradual transmission/voltage curve is desired, for example, in dashboard display devices.

Figure 5:
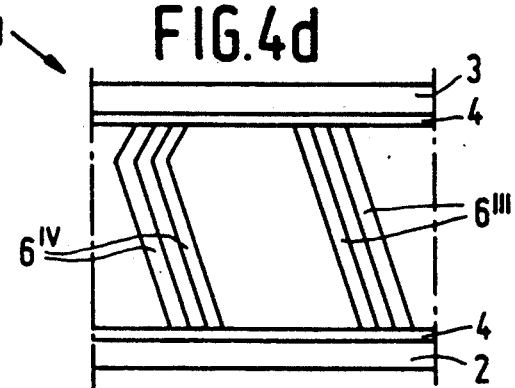
FIG. 5 is a cross-section similar to that of FIG. 1, showing another embodiment of the invention.

Although in the example described only smectic layers having a so-called "chevron structure" are used, the layers 6 need not necessarily have a kink but may alternatively be planar (layers $6^{iii}$ in FIG. 5), with the angles of the layers $6^{iii}$ exhibiting a spread with respect to the supporting plates. Moreover, the kink of the "chevron" need not necessarily be in the centre of the smectic layer (see $6^{iv}$ in FIG. 5).

We claim:

1. A liquid crystal device comprising a ferroelectric liquid crystal medium having smectic layers between two supporting plates provided with electrodes, said device has a transmission-voltage characteristic, characterized in that the smectic layers exhibit a spread of angles with respect to at least one of the supporting plates, whereby a gradual transmission/voltage characteristic is achieved.

2. A display device as claimed in claim 1, in which there are spacers between the plates, and in which the first supporting plate comprises a system of row electrodes and the second supporting plate comprises a system of column electrodes, the areas of crossings of row and column electrodes defining pixels, characterized in that the spread of angles of the smectic layers of the ferroelectric liquid crystal medium is exhibited in at least a part of the areas defining pixels.

3. A display device as claimed in claim 1, characterized in that the transmission/voltage characteristic of the pixels, viewed normally to the plates, exhibits a transition range.

4. A display device as claimed in claim 2, characterized in that the spread of angles is substantially uniform from pixel to pixel.

5. A display device as claimed in claim 2, characterized in that at least one of the electrodes has a spread in the degree of the surface roughness of each pixel.

6. A device as claimed in claim 3 characterized in that the width of the transition range in the transmission/voltage characteristic is at least 0.5 Volt.

7. A display device as claimed in claim 2, characterized in that there are at least 10 spacers per pixel.

8. A display device as claimed in claim 7, characterized in that the spacers are distributed substantially uniformly.

9. A display device as claimed in claim 3, characterized in that a desired transmission state is reached from an extreme transmission state.

10. A display device as claimed in claim 2, characterized in that the transmission/voltage characteristic of the pixels, viewed normally to the plates, exhibits a transition range.

11. A display device as claimed in claim 3, characterized in that the spread of angles is substantially uniform from pixel to pixel.

12. A display device as claimed in claim 3 characterized in that at least one of the electrodes has a spread in the degree of the surface roughness of each pixel.

13. A display device as claimed in claim 4 characterized in that at least one of the electrodes has a spread in the degree of the surface roughness of each pixel.

14. A device as claimed in claim 4 characterized in that the width of the transition range in the transmission/voltage characteristic is at least 0.5 Volt.

15. A device as claimed in claim 5 characterized in that the width of the transition range in the transmission/voltage characteristic is at least 0.5 Volt.

16. A display device as claimed in claim 3, characterized in that there are least 10 spacers per pixel.

17. A display device as claimed in claim 4, characterized in that there are least 10 spacers per pixel.

18. A display device as claimed in claim 5, characterized in that there are at least 10 spacers per pixel.

19. A display device as claimed in claim 6, characterized in that there are at least 10 spacers per pixel.

20. A display device as claimed in claim 4, characterized in that a desired transmission state is reached from an extreme transmission state.

21. A display device as claimed in claim 5, characterized in that a desired transmission state is reached from an extreme transmission state.

22. A display device as claimed in claim 6, characterized in that a desired transmission state is reached from an extreme transmission state.

23. A display device as claimed in claim 7, characterized in that a desired transmission state is reached from an extreme transmission state.

24. A display device as claimed in claim 8, characterized in that a desired transmission state is reached from an extreme transmission state.

25. A method of manufacturing a liquid crystal display device comprising a ferroelectric liquid crystal medium having smectic layers between two supporting plates provided with electrodes, said device has a transmission/voltage characteristic, characterized in that the device is subjected to at least one low-frequency electric field treatment at a low field strength, resulting in a spread of angles of the smectic layers with respect to at least one of the supporting plates, whereby a gradual transmission/voltage characteristic is achieved.

26. A method as claimed in claim 25, characterized in that the device is subjected to at least one low-frequency treatment at a high field strength after the low-frequency electric field treatment at a low field strength.

27. A method as claimed in claim 25, characterized in that the device is subjected to a plurality of low-frequency treatments at different field strengths.

28. A method as claimed in claim 25, characterized in that the electric field treatment is combined with a thermal treatment.

29. A method as claimed in claim 28, characterized in that the thermal treatment comprises local heating.

30. A method as claimed in claim 28, characterized in that the thermal treatment comprises local cooling.

31. A method as claimed in claim 28, characterized in that the thermal treatment comprises providing a thermal gradient.

32. A method of manufacturing a liquid crystal display device comprising a ferroelectric liquid crystal medium having smectic layers between two supporting plates provided with electrodes, which device has transmission/voltage characteristic, characterized in that a spread of angles of the smectic layers with respect to at least one of the supporting plates is obtained by a thermal treatment, whereby a gradual transmission/voltage characteristic is achieved.

33. A method of manufacturing a liquid crystal display device comprising a ferroelectric liquid crystal medium having smectic layers between two supporting plates provided with electrodes, said device has a transmission/voltage characteristic, characterized in that a spread of angles of the smectic layers with respect to at least one of the supporting plates is obtained by a mechanical or a chemical treatment, whereby a gradual transmission/voltage characteristic is achieved.

* * * * *